US008266593B2

(12) United States Patent
Narayanan et al.

(10) Patent No.: US 8,266,593 B2
(45) Date of Patent: *Sep. 11, 2012

(54) SYSTEM AND METHOD FOR ANALYZING PERFORMANCE OF A SOFTWARE TESTING SYSTEM

(75) Inventors: Ajikumar Thaitharanikarthu Narayanan, Bangalore (IN); Ramprasad Malavalli Krishnamurthi, Malavalli (IN)

(73) Assignee: Wipro Limited, Bangalore, Karnataka (IN)

( * ) Notice: Subject to any disclaimer, the term of this patent is extended or adjusted under 35 U.S.C. 154(b) by 953 days.

This patent is subject to a terminal disclaimer.

(21) Appl. No.: 12/325,287

(22) Filed: Dec. 1, 2008

(65) Prior Publication Data

US 2010/0138812 A1   Jun. 3, 2010

(51) Int. Cl.
*G06F 9/44* (2006.01)
(52) U.S. Cl. ........ 717/124; 717/127; 717/131; 717/132; 714/38.1
(58) Field of Classification Search ........................ None
See application file for complete search history.

(56) References Cited

U.S. PATENT DOCUMENTS

| | | | | |
|---|---|---|---|---|
| 6,186,677 B1* | 2/2001 | Angel et al. | | 717/118 |
| 6,385,765 B1* | 5/2002 | Cleaveland et al. | | 717/100 |
| 6,467,052 B1* | 10/2002 | Kaler et al. | | 714/39 |
| 6,550,057 B1* | 4/2003 | Bowman-Amuah | | 717/126 |
| 6,701,514 B1* | 3/2004 | Haswell et al. | | 717/115 |
| 6,718,535 B1* | 4/2004 | Underwood | | 717/101 |
| 6,775,824 B1* | 8/2004 | Osborne et al. | | 717/125 |
| 6,907,546 B1* | 6/2005 | Haswell et al. | | 714/38.11 |
| 7,289,964 B1* | 10/2007 | Bowman-Amuah | | 705/1.1 |
| 7,343,524 B2* | 3/2008 | Klotz et al. | | 714/39 |
| 7,356,805 B2* | 4/2008 | Ding et al. | | 717/128 |
| 7,519,961 B2* | 4/2009 | Alexander et al. | | 717/133 |
| 7,698,686 B2* | 4/2010 | Carroll et al. | | 717/125 |
| 7,930,436 B1* | 4/2011 | Znosko | | 709/247 |
| 2003/0058277 A1* | 3/2003 | Bowman-Amuah | | 345/765 |
| 2003/0187744 A1* | 10/2003 | Goodridge, Jr. | | 705/26 |
| 2004/0153863 A1* | 8/2004 | Klotz et al. | | 714/45 |
| 2004/0243978 A1* | 12/2004 | Walmsley | | 717/120 |
| 2004/0260517 A1* | 12/2004 | Ding et al. | | 702/186 |
| 2005/0257199 A1* | 11/2005 | Johansson et al. | | 717/126 |
| 2006/0107220 A1* | 5/2006 | Letkeman et al. | | 715/751 |
| 2006/0248401 A1* | 11/2006 | Carroll et al. | | 714/38 |
| 2008/0104096 A1* | 5/2008 | Doval et al. | | 707/101 |
| 2010/0175046 A1* | 7/2010 | Hammer et al. | | 717/110 |
| 2010/0250497 A1* | 9/2010 | Redlich et al. | | 707/661 |

OTHER PUBLICATIONS

Title: Using Model Trees for Computer Architecture Performance Analysis of Software Applications, author: Ould-Ahmed-Vall, E et al, source: IEEE, dated: 2007.*

Title: Performance Testing Based on Time complexity analysis for embedded software, author: Jin et al, source: IEEE dated: Jul. 29, 2008.*

* cited by examiner

*Primary Examiner* — Chameli Das
(74) *Attorney, Agent, or Firm* — Prakash Nama; Global IP Services, PLLC

(57) ABSTRACT

A method of analyzing performance of a software testing system associated with a software system having multiple modules includes performing a computer-based complexity analysis of the software system, performing a computer-based impact analysis of information related to an impact of a defect on a module of the software system, and generating a computer-based distribution of effort across an impacted module of the software system based on the complexity analysis and the impact analysis to enhance the software testing system performance. The information may include reported defects from a working environment associated with the software system. The method may also include utilizing output data associated with the complexity analysis as input data to the impact analysis.

15 Claims, 4 Drawing Sheets

SYSTEM AND METHOD FOR ANALYZING PERFORMANCE OF A SOFTWARE TESTING SYSTEM

FIELD OF TECHNOLOGY

Embodiments of the present invention relate to the field of testing of computer software. More particularly, embodiments of the present invention relate to a system and method for analyzing performance of a software testing system.

BACKGROUND

Software products may consist of multiple components/modules. In a software product testing scenario, the software product having multiple components/modules may progress through a testing lifecycle and encounter different challenges at different phases.

The challenges include, for example, finding an efficient, streamlined, and accurate way to test the software product.

Further, once a software testing system, i.e., "testing system" is employed, challenges may arise in analyzing performance of the testing system in a production environment. The production environment may have disparate groups using the testing system. The disparate groups may lack means of identifying testing systems issues. The disparate groups may also lack a consistent method for reporting the issues related to the performance of the testing system.

Moreover, challenges may exist with respect to aggregating the issues related to performance, analyzing the aggregated issues, and based on the issues, modifying the testing system to reduce the issues and optimize the performance of the testing system.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

A system and method for analyzing performance of a software testing system is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
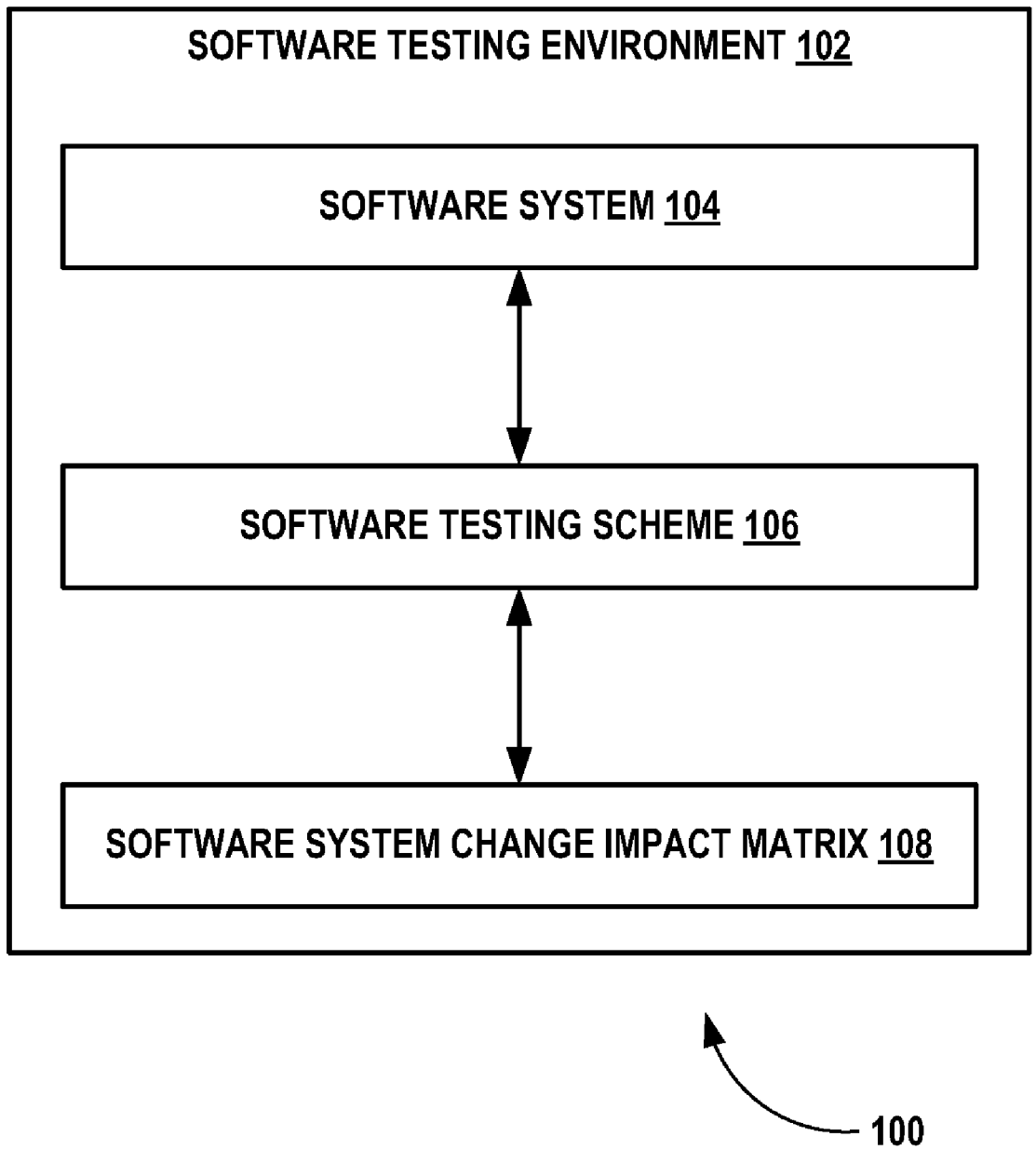
FIG. 1 illustrates a block diagram of a software testing environment, according to one embodiment.

FIG. 1 illustrates a block diagram 100 of a software testing environment 102, according to one embodiment. Particularly, FIG. 1 illustrates a software system 104, a software testing scheme 106 and a software system change impact matrix 108. The software system 104 refers to a computer program, procedure and/or documentation that perform some tasks on a data processing system (e.g., a computer). The software system 104 includes several modules that need to be quality tested with respect to a context in which the software system 104 is intended to operate.

The software testing scheme 106 analyses interdependency among all the modules of the software system 104 and segregates the modules into different levels of hierarchy based on a dependency structure matrix (DSM) analysis. In one exemplary implementation, the modules in level 1 are executed first, and then the modules in level 2 and so on, during a process of test execution. In another exemplary implementation, the modules of the software system 104 belonging to a same level can be executed in parallel as the modules are not interdependent. The software system change impact matrix 108 analyzes change impact during a maintenance phase of a test cycle. In other words, the software system change impact matrix 108 analyzes performance of a software testing system associated with the software system 104.

Figure 2:
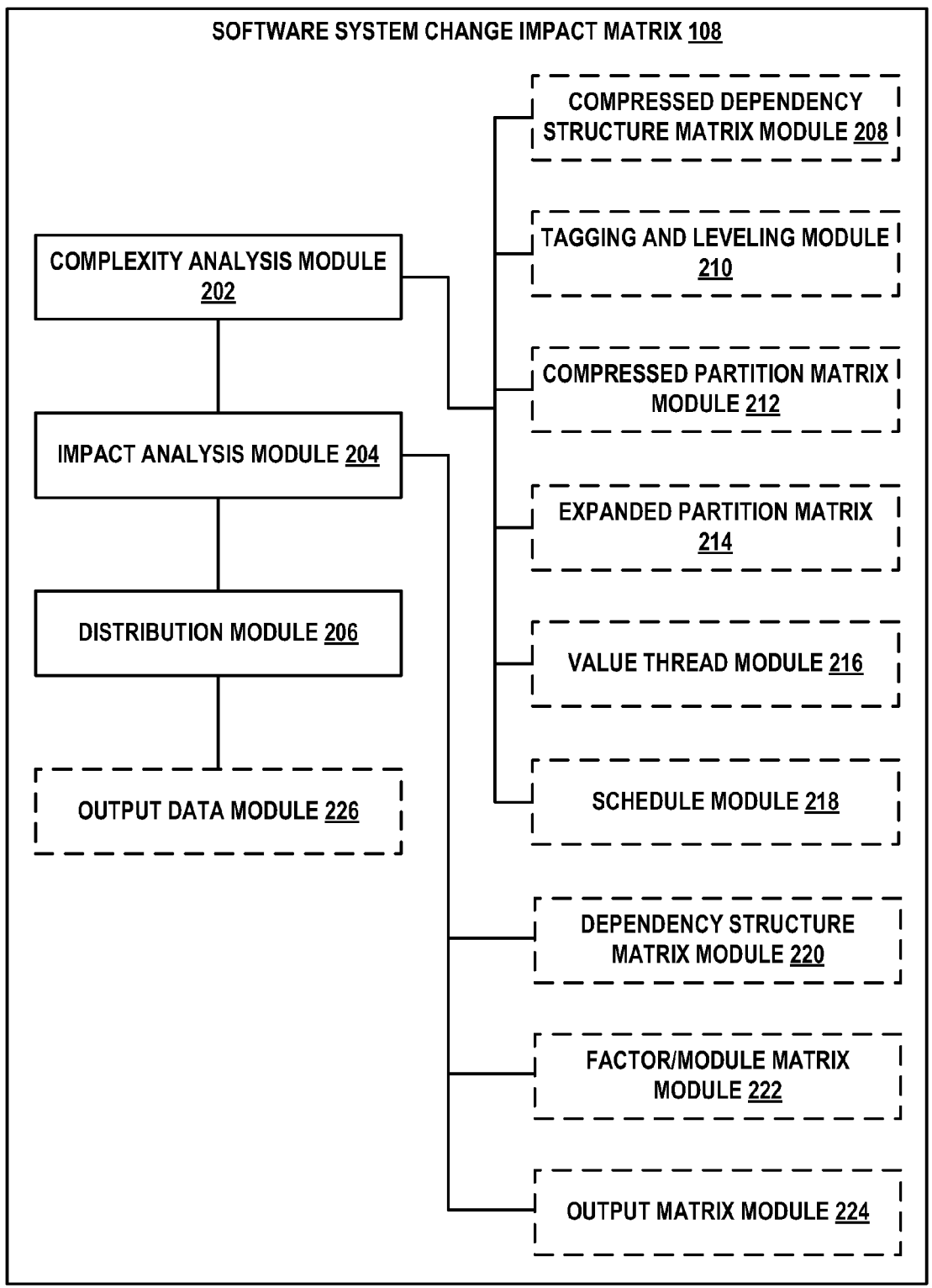
FIG. 2 illustrates a block diagram showing various modules associated with the software system change impact matrix of FIG. 1, according to one embodiment.

FIG. 2 illustrates a block diagram 200 showing various modules associated with the software system change impact matrix 108 of FIG. 1, according to one embodiment. Particularly, FIG. 2 illustrates a complexity analysis module 202, an impact analysis module 204, a distribution module 206 and an output data module 226.

In operation, the complexity analysis module 202 performs a complexity analysis of the software system 104 on a computer, e.g., a data processing system. An exemplary algorithm for performing the complexity analysis is illustrated in APPENDIX A. As shown in FIG. 2, the complexity analysis module 202 includes a compressed dependency structure matrix module 208, a tagging and levelling module 210, a compressed partition matrix module 212, an expanded partition matrix 214, a value thread module 216 and a schedule module 218. In one embodiment, the compressed DSM module 208 generates a compressed dependency structure matrix based on sorted cyclic blocks associated with the modules of the software system 104. The tagging and levelling module 210 tags and levels the modules of the software system 104 based on the compressed DSM. The compressed partition matrix module 212 generates a compressed partition matrix based on the tagged and levelled modules. The expanded partition matrix 214 generates an expanded partition matrix based on the compressed partition matrix. The value thread module 216 generates value threads using the compressed partition matrix. The schedule module 218 obtains a new scheduling table and performs a path analysis using the value threads.

The impact analysis module 204 performs, on the computer, an impact analysis of information related to an impact of a defect on a module of the software system 104. An exemplary algorithm for performing the impact analysis is illustrated in APPENDIX B. Further, as shown in FIG. 2, the impact analysis module 204 includes a dependency structure matrix module 220, a factor/module matrix 222 and an output matrix module 224. The dependency structure matrix module 220 generates a DSM having dependencies associated with the software system 104. The factor/module matrix module 222 generates a factor/module matrix associated with a change and/or an impact to the module. The output matrix module 224 generates an output matrix based on the DSM and the factor/module matrix having a module impact indication and/or a factor impact indication.

The distribution module 206 then generates, via the computer, a distribution of effort across the impacted module of the software system 104 based on the complexity analysis and the impact analysis to enhance the software testing system performance. In accordance with the above mentioned embodiments, the output data module 226 utilizes output data associated with the complexity analysis as input data to the impact analysis. For example, the output data associated with the complexity analysis includes an application dependency on system index, a system dependency on application index, an application contribution to system complexity, an application contribution, etc.

Figure 3:
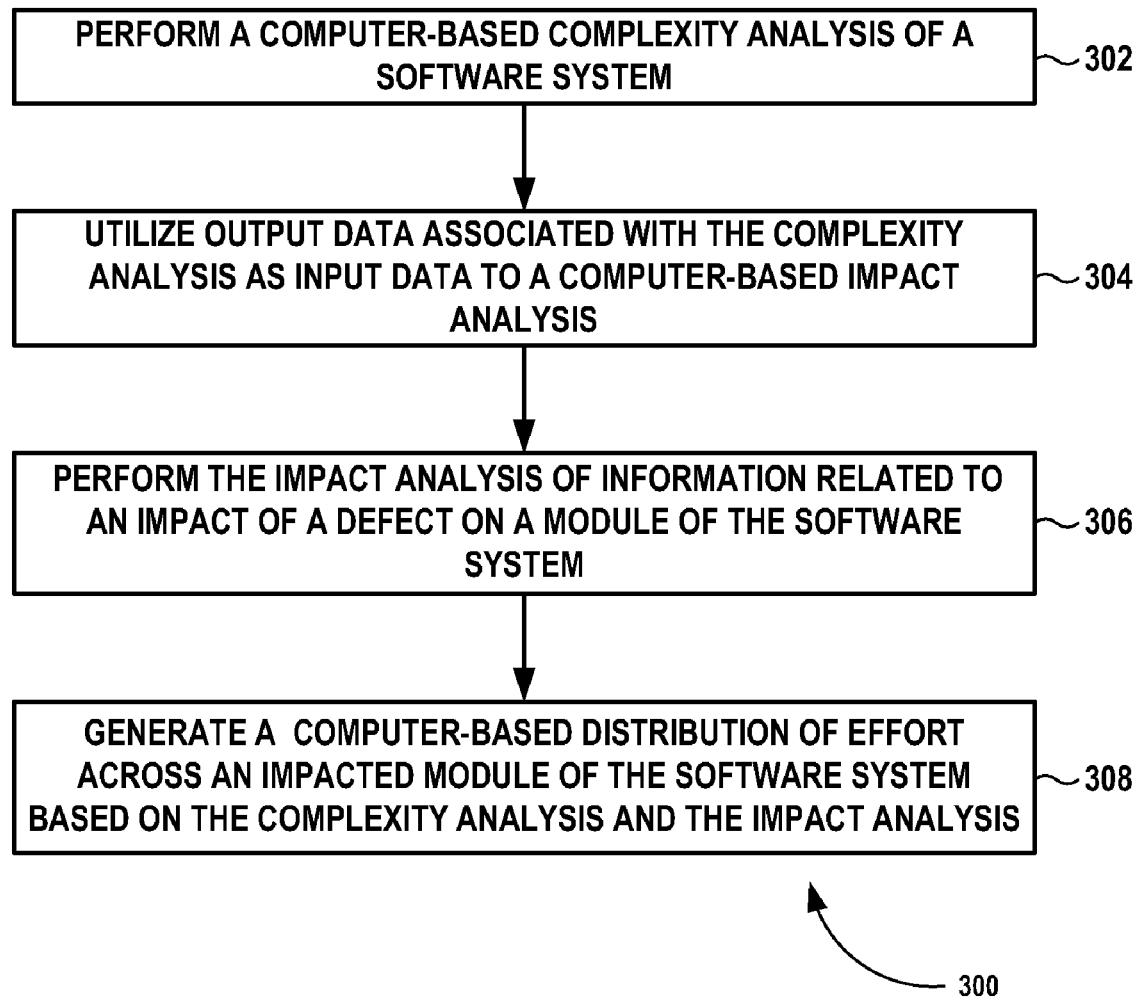
FIG. 3 illustrates a process flowchart of analyzing performance of a software testing system associated with a software system having multiple modules, according to one embodiment.

FIG. 3 illustrates a process flowchart 300 of analyzing performance of a software testing system associated with a software system having multiple modules, according to one embodiment. In operation 302, a computer-based complexity analysis of the software system is performed. In some embodiments, the complexity analysis includes generating a compressed DSM based on sorted cyclic blocks associated with the modules of the software system, tagging and levelling the modules of the software system based on the compressed DSM and generating a compressed partition matrix based on the tagged and levelled modules. Further, the complexity analysis includes generating an expanded partition matrix based on the compressed partition matrix, generating value threads using the compressed partition matrix, and obtaining a new scheduling table and performing a path analysis to determine an efficient software testing scheme using the value threads.

In operation 304, output data associated with the complexity analysis is utilized as input data to a computer-based impact analysis. For example, the output data associated with the complexity analysis includes an application dependency on system index, a system dependency on application index, an application contribution to system complexity, an application contribution, etc. In operation 306, the impact analysis of information (e.g., reported defects from a working environment associated with the software system) related to an impact of a defect on a module of the software system is performed.

In some embodiments, the impact analysis includes generating a DSM having dependencies associated with the software system, generating a factor/module matrix associated with a change and/or an impact to the module, and generating an output matrix based on the DSM and the factor/module matrix having a module impact indication and/or a factor impact indication. In operation 308, a computer-based distribution of effort is generated across an impacted module of the software system based on the complexity analysis and the impact analysis to enhance the software testing system performance.

Figure 4:
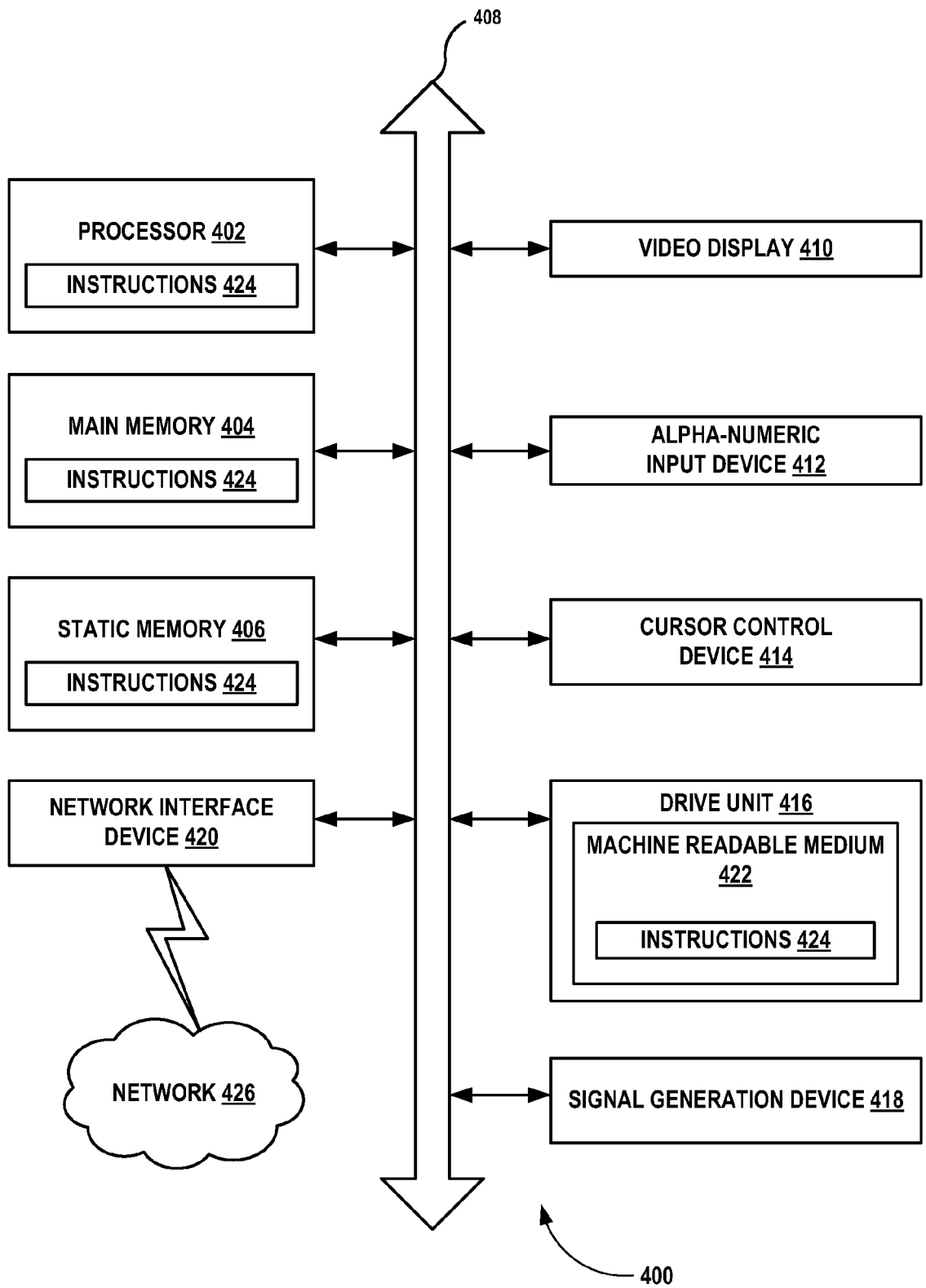
FIG. 4 illustrates a diagrammatic system view of a data processing system in which any of the embodiments disclosed herein may be performed, according to one embodiment.

FIG. 4 illustrates a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a BIOS and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of a method of analyzing performance of a software testing system associated with a software system (e.g., the software system 104 of FIG. 1), the method includes performing a computer-based complexity analysis of the software system 104, performing a computer-based impact analysis of information (e.g., reported defects from a working environment associated with the software system 104) related to an impact of a defect on a module of the software system 104, and generating a computer-based distribution of effort across an impacted module of the software system 104 based on the complexity analysis and the impact analysis to enhance the software testing system performance.

In some embodiments, the complexity analysis includes generating a compressed DSM based on sorted cyclic blocks associated with modules of the software system 104, tagging and levelling the modules of the software system 104 based on the compressed DSM, generating a compressed partition matrix based on the tagged and levelled modules, generating an expanded partition matrix based on the compressed partition matrix, generating value threads using the compressed partition matrix, and obtaining a new scheduling table and performing a path analysis to determine an efficient software testing scheme using the value threads.

In these embodiments, the impact analysis includes generating a DSM having dependencies associated with the software system 104, generating a factor/module matrix associated with a change and/or an impact to the module, and generating an output matrix based on the DSM and the factor/module matrix having a module impact indication and/or a factor impact indication. Further, the storage medium may have instructions to utilize output data associated with the complexity analysis as input data to the impact analysis. For example, the output data associated with the complexity analysis includes an application dependency on system index, a system dependency on application index, an application contribution to system complexity, an application contribution and the like.

Further, in accordance with the above described embodiments, analyzing performance of a software testing system associated with the software system 104 to enhance the software testing system performance is described below.

Table 1 shows a DSM matrix which is used as an input for a computer-based complexity estimation and analysis (e.g., performed by the complexity analysis module 202 of FIG. 2).

TABLE 1

| COHESION | MODULE NO. | 1 | 2 | 3 | 4 | 5 | 6 | 7 | 8 | 9 | 10 |
|---|---|---|---|---|---|---|---|---|---|---|---|
| 1 | 1 |  |  |  | 1 |  |  |  |  |  |  |
| 2 | 2 | 1 |  | 1 |  |  |  |  |  |  |  |
| 3 | 3 |  |  | 1 |  |  |  |  |  |  |  |
| 1 | 4 |  | 1 |  |  |  |  | 1 |  |  |  |
| 4 | 5 |  |  |  |  | 1 |  | 1 |  |  |  |
| 2 | 6 |  |  |  |  |  | 1 |  |  |  |  |
| 5 | 7 |  |  |  |  |  |  | 1 |  |  |  |
| 2 | 8 |  |  |  |  |  |  | 1 |  |  |  |
| 1 | 9 |  |  |  |  |  |  |  |  | 1 |  |
| 2 | 10 |  |  |  |  |  |  |  |  |  |  |

Table 2 shows an output of the complexity analysis. In some embodiments, the output data associated with the complexity analysis is utilized as input data for a computer-based impact analysis, which is shown in Table 3 below. For example, the output data associated with the complexity analysis includes an application dependency on system index (ADSI), a system dependency on application index (SDAI), an application contribution to system complexity (ACSC), an application contribution (AC), etc.

TABLE 2

| MODULE NAME | MODULE NO. | ADSI (%) | SDAI (%) | ACSC (%) | AC (%) |
|---|---|---|---|---|---|
| a | 1 | 8.3 | 4.2 | 6.2 | 3.1 |
| b | 2 | 11.7 | 11.3 | 11.5 | 5.6 |
| c | 3 | 6.7 | 18.5 | 12.6 | 6.2 |
| d | 4 | 10.3 | 3.4 | 6.9 | 3.4 |
| e | 5 | 12 | 12.4 | 12.2 | 6 |
| f | 6 | 7 | 18 | 12.5 | 6.1 |
| g | 7 | 12 | 7.1 | 9.6 | 4.7 |
| h | 8 | 7 | 11.7 | 9.3 | 4.6 |
| i | 9 | 15 | 3.3 | 9.2 | 4.5 |
| j | 10 | 10 | 10 | 10 | 4.9 |

Table 3 below shows a factor/module matrix associated with a change and impact to each module of the software system 104.

TABLE 3

| | MODULE NO | | | | | | | | | |
|---|---|---|---|---|---|---|---|---|---|---|
| FACTOR NO. | 1 | 2 | 3 | 4 | 5 | 6 | 7 | 8 | 9 | 10 |
| 1 | 0.5 |  | 0.2 |  | 1 |  |  | 0.8 |  | 0.8 |
| 2 | 0.2 | 1 |  | 1 |  |  | 0.5 | 0.5 | 0.2 |  |
| 3 | 1 |  | 0.5 | 0.2 |  |  |  | 0.8 |  | 0.5 |
| 4 |  | 0.5 |  |  |  |  | 0.5 | 1 |  | 0.2 |

Further, the output matrix (also referred as software system change impact matrix) associated with the impact analysis having a module impact indication and a factor impact indication is shown in Table 4 below.

TABLE 4

| MODULE IMPACT INDEX TABLE | | | | FACTOR IMPACT INDEX TABLE | | | |
|---|---|---|---|---|---|---|---|
| MODULE NAME | MODULE NO. | % MII | MII | FACTOR NAME | FACTOR NO. | % FII | MII |
| a | 1 | 9.34 | 4.58 | F1 | 1 | 26.35 | 11.62 |
| b | 2 | 15.75 | 7.72 | F2 | 2 | 36.43 | 16.07 |
| c | 3 | 7.85 | 3.85 | F3 | 3 | 22.9 | 10.1 |
| d | 4 | 6.91 | 3.39 | F4 | 4 | 14.32 | 6.32 |
| e | 5 | 9.15 | 4.48 | | | | |
| f | 6 | 0 | 0 | | | | |
| g | 7 | 9.35 | 4.58 | | | | |
| h | 8 | 27.19 | 13.362 | | | | |
| i | 9 | 1.48 | 0.73 | | | | |
| j | 10 | 12.97 | 6.63 | | | | |

The above-described method has two features viz., complexity analysis and change impact analysis which are seamlessly integrated. In one embodiment, the user can choose to obtain both complexity analysis output and impact analysis output together or individually. Further, the above-described method is more user friendly in terms of providing inputs and obtaining the outputs. For example, the outputs can be obtained in different formats, for example, in MS Excel, HTML or CSV format as per the user preference. Further, speed with which the complexity dependency change impact tool analyses a software system as a whole and generates the output helps in reducing the total time and effort required across the product testing phase.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, e.g., complementary metal-oxide semiconductor (CMOS) based logic circuitry, firmware, software and/or any combination of hardware, firmware, and/or software, e.g., embodied in a machine readable medium. For example, the various electrical structure and methods may be embodied using transistors, logic gates, and electrical circuits, e.g., application specific integrated circuitry (ASIC).

APPENDIX A

Input Matrix
MD: n*n matrix
Output Matrices
RS: n*1 matrix
CS: n*1
ADSI: n*1

APPENDIX A-continued

```
SDAI: n*1
ACSC: n*1
AC: n*1
SC - variable
x - local variable
Initialize all output matrices
Creating RS
For i = 1 to n
    X=0
    For j = 1 to n
        x = x+ MD(i,j)
    RS(i) = 1/x
    SC=SC+x
Creating CS
For j = 1 to n
    X=0
    For i = 1 to n
        x = x+ MD(i,j)
    CS(j) = 1/x
Creating ADSI
For i = 1 to n
    X=0
    For j = 1 to n
        x = x+ MD(i,j) *CS(j)
    ADSI(i) = x/n
Creating SDAI
For j = 1 to n
    X=0
    For i = 1 to n
        x = x+ MD(i,j) *RS(i)
    SDAI(j) = x/n
Creating ACSC
For i = 1 to n
    ACSC(i) = [ ADSI(i) + SDAI(i) ] / 2
Creating AC
For i = 1 to n
    AC(i) = SC* ACSC(i)
Display SC on top
Display ADSI, SDAI, ACSC and AC in adjacent
columns with proper heading.
```

APPENDIX B

```
Input Matrices
MD: n*n matrix
AC: n*1 matrix
SCIM1: m*n matrix
Output Matrices
SCIM2: m*n
SCIM3: n*1
SCIM4: m*n
SCIM5: m*1
SCIM6: m*n
FII: m*2
MII: m*2
X - local variable
Initialize all output matrices
Creating SCIM2
For I = 1 to m
    For j = 1 to n
        SCIM2( i,j) = SCIM(i,j) * AC(j)
Creating SCIM3
For j = 1 to n
    x = 0
    For I = 1 to m
        x = x + SCIM2(i,j)
    SCIM3(j) = x
Creating SCIM4
For i = 1 to m
    For j = 1 to n
        SCIM4(i,j) = SCIM2(i,j) / SCIM3(j)
Creating FII
For i = 1 to m
    x = 0
    For j = 1 to n
        x = x + SCIM4(i,j)
    FII(i,1) = x/(n-y)
```

APPENDIX B-continued

```
    FII(i,2) = SC*x/(n-y)
Creating SCIM5
For i = 1 to m
    x = 0
    For j = 1 to n
        x = x + SCIM2(i,j)
    SCIM5(i) = x
Creating SCIM6
For i = 1 to m
    For j = 1 to n
        SCIM6(i,j) = SCIM2(i,j) / SCIM5(i)
Creating MII
For j = 1 to n
    x = 0
    For i = 1 to m
        x = x + SCIM6(i,j)
    MII(j,1) = x/(m-z)
    MII(j,2) = SC*x/(m-z)
Display FII and MII
```

What is claimed is:

1. A method of analyzing performance of a software testing system associated with a software system having multiple modules, the method comprising:
    performing a complexity analysis of the software system by a computer;
    performing an impact analysis of information related to an impact of at least one defect on at least one module of the software system during a maintenance phase of a test cycle by the computer; and
    generating, by the computer, distribution of effort across at least one impacted module of the software system based on the complexity analysis and the impact analysis to enhance the software testing system performance;
    wherein the complexity analysis comprises:
    generating a compressed dependency structure matrix based on sorted cyclic blocks associated with modules of the software system;
    based on the compressed dependency structure matrix, tagging and leveling the modules of the software system;
    based on the tagged and leveled modules, generating at least one compressed partition matrix;
    based on the at least one compressed partition matrix, generating at least one expanded partition matrix;
    using the at least one compressed partition matrix, generating value threads; and
    using the value threads, obtaining a new scheduling table and performing a path analysis to determine an efficient software testing scheme.

2. The method of claim 1, wherein the information comprises reported defects from a working environment associated with the software system.

3. The method of claim 1, wherein the impact analysis comprises:
    generating a dependency structure matrix having dependencies associated with the software system;
    generating a factor/module matrix associated with at least one of a change and impact to the at least one module; and
    generating an output matrix based on the dependency structure matrix and the factor/module matrix having at least one of a module impact indication and a factor impact indication.

4. The method of claim 1, further comprising:
    utilizing output data associated with the complexity analysis as input data to the impact analysis.

5. The method of claim 4, wherein the output data associated with the complexity analysis is selected from the group consisting essentially of an application dependency on system index, a system dependency on application index, an application contribution to system complexity, and an application contribution.

6. A system for analyzing performance of a software testing system associated with a software system having multiple modules, the system comprising:
a processor;
memory coupled to the processor; wherein the memory includes:
a complexity analysis module to perform, on a computer, a complexity analysis of the software system;
an impact analysis module to perform, on a computer, an impact analysis of information related to an impact of at least one defect on at least one module of the software system during a maintenance phase of a test cycle; and
a distribution module to generate, via a computer, a distribution of effort across the at least one impacted module of the software system based on the complexity analysis and the impact analysis to enhance the software testing system performance; wherein the complexity analysis module comprises:
a compressed dependency structure matrix module to generate, based on sorted cyclic blocks associated with the modules of the software system, a compressed dependency structure matrix;
a tagging and leveling module to tag and level, based on the compressed dependency structure matrix, the modules of the software system;
a compressed partition matrix module to generate, based on the tagged and leveled modules, at least one compressed partition matrix;
an expanded partition matrix to generate, based on the at least one compressed partition matrix, at least one expanded partition matrix;
a value thread module to generate, using the at least one compressed partition matrix, value threads; and
a schedule module to obtain, using the value threads, a new scheduling table and to perform a path analysis.

7. The system of claim 6, wherein the information comprises reported defects from a working environment associated with the software system.

8. The system of claim 6, wherein the impact analysis module comprises:
a dependency structure matrix module to generate a dependency structure matrix having dependencies associated with the software system;
a factor/module matrix module to generate a factor/module matrix associated with at least one of a change and impact to the at least one module; and
an output matrix module to generate an output matrix based on the dependency structure matrix and the factor/module matrix having at least one of a module impact indication and a factor impact indication.

9. The system of claim 6, further comprising:
an output data module to utilize output data associated with the complexity analysis as input data to the impact analysis.

10. The system of claim 9, wherein the output data associated with the complexity analysis is selected from the group consisting essentially of an application dependency on system index, a system dependency on application index, an application contribution to system complexity, and an application contribution.

11. An article, comprising:
a non-transitory computer-readable storage medium storing instructions, that when executed by a computer, result in execution of a method of analyzing performance of a software testing system associated with a software system having multiple modules, the method comprising:
performing a computer-based complexity analysis of the software system;
performing a computer-based impact analysis of information related to an impact of at least one defect on at least one module of the software system during maintenance phase of the test cycle; and
generating a computer-based distribution of effort across at least one impacted module of the software system based on the complexity analysis and the impact analysis to enhance the software testing system performance; wherein the complexity analysis comprises:
generating a compressed dependency structure matrix based on cyclic blocks associated with modules of the software system;
based on the compressed dependency structure matrix, tagging and leveling the modules of the software application;
based on the tagged and leveled modules, generating at least one compressed partition matrix;
based on the at least one compressed partition matrix, generating at least one expanded partition matrix;
using the at least one compressed partition matrix, generating value threads; and
using the value threads, obtaining a new scheduling table and performing a path analysis to determine an efficient software testing scheme.

12. The article of claim 11, wherein the information comprises reported defects from a working environment associated with the software system.

13. The article of claim 11, wherein the impact analysis comprises:
generating a dependency structure matrix having dependencies associated with the software system;
generating a factor/module matrix associated with at least one of a change and impact to the at least one module; and
generating an output matrix based on the dependency structure matrix and the factor/module matrix having at least one of a module impact indication and a factor impact indication.

14. The article of claim 11, further comprising:
utilizing output data associated with the complexity analysis as input data to the impact analysis.

15. The article of claim 14, wherein the output data associated with the complexity analysis is selected from the group consisting essentially of an application dependency on system index, a system dependency on application index, an application contribution to system complexity, and an application contribution.

* * * * *